United States Patent [19]

Federico et al.

[11] Patent Number: 4,689,739
[45] Date of Patent: Aug. 25, 1987

[54] METHOD FOR PROVIDING PRIORITY INTERRUPTS IN AN ELECTROPHOTOGRAPHIC MACHINE

[75] Inventors: Anthony M. Federico, Webster; Ernest L. Legg, Fairport, both of N.Y.

[73] Assignee: Xerox Corporation, Stamford, Conn.

[21] Appl. No.: 479,425

[22] Filed: Mar. 28, 1983

[51] Int. Cl.⁴ .............................................. G06F 9/46
[52] U.S. Cl. .................................................. 364/200
[58] Field of Search ... 364/200 MS File, 900 MS File, 364/184; 355/14 R, 14 C

[56] References Cited

U.S. PATENT DOCUMENTS

| | | | |
|---|---|---|---|
| 3,614,742 | 10/1971 | Watson | 364/200 |
| 3,699,529 | 10/1972 | Beyers et al. | 364/200 |
| 3,760,365 | 9/1973 | Kurtzberg et al. | 364/200 |
| 3,787,816 | 1/1974 | Hauck et al. | 364/200 |
| 3,805,247 | 4/1974 | Zucker et al. | 364/200 |
| 3,812,469 | 5/1974 | Hauck et al. | 364/200 |
| 3,916,383 | 10/1975 | Malcolm | 364/200 |
| 3,978,452 | 8/1976 | Barton et al. | 364/200 |
| 3,983,539 | 9/1976 | Faber et al. | 364/200 |
| 3,983,541 | 9/1976 | Faber et al. | 364/200 |
| 4,044,334 | 8/1977 | Bachman et al. | 364/200 |
| 4,064,395 | 12/1977 | Schubeler et al. | 364/107 |
| 4,084,228 | 4/1978 | Dufond et al. | 364/200 |
| 4,099,252 | 7/1978 | Danco | 364/900 |
| 4,123,794 | 10/1978 | Matsumoto | 364/101 |
| 4,138,718 | 2/1979 | Toke et al. | 364/200 |
| 4,170,791 | 10/1979 | Daughton et al. | 364/900 |
| 4,186,299 | 1/1980 | Batchelor | 235/304.1 |
| 4,215,395 | 7/1980 | Bunyard et al. | 364/101 |
| 4,219,873 | 8/1980 | Kober et al. | 364/200 |
| 4,224,664 | 9/1980 | Trinchieri | 364/200 |
| 4,228,495 | 10/1980 | Bernard et al. | 364/101 |
| 4,229,790 | 10/1980 | Gilliland et al. | 364/200 |
| 4,253,145 | 2/1981 | Goldberg | 364/200 |
| 4,304,001 | 12/1981 | Cope | 371/8 |
| 4,327,993 | 5/1982 | Gauronski et al. | 355/14 SH |

OTHER PUBLICATIONS

PIC8259A, MCS-80/85, Family User's Manual, Oct. 1979, pp. 6-132→6-147.

*Primary Examiner*—Eddie P. Chan
*Attorney, Agent, or Firm*—Ronald F. Chapuran

[57] ABSTRACT

An Interrupt Manager for servicing interrupts. An interrupt is performed only after an atomic operation (Operating System instruction) is completed. After completion of each operating system instruction, a first command immediately allows any interrupt to be serviced. A second command then immediately closes out any interrupts, allowing for the execution of the next operating system instruction.

3 Claims, 14 Drawing Figures

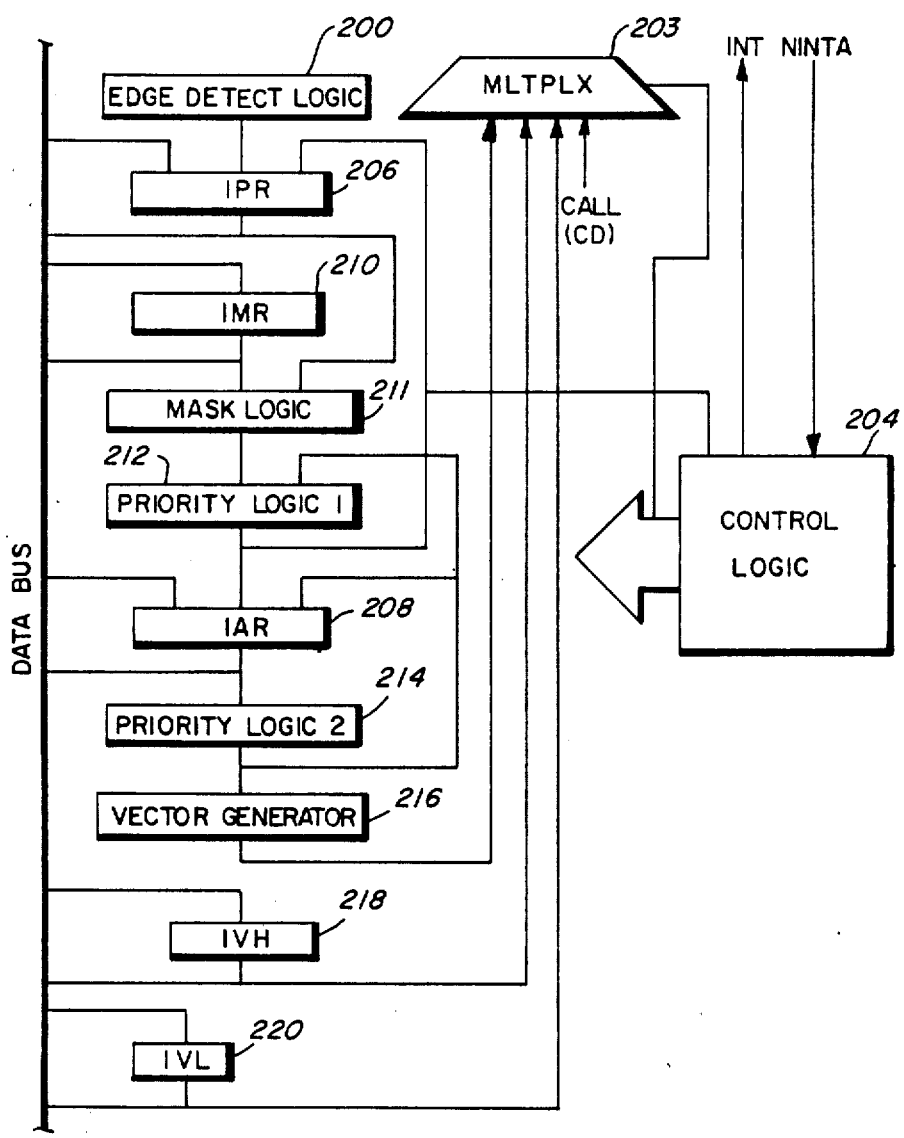

METHOD FOR PROVIDING PRIORITY INTERRUPTS IN AN ELECTROPHOTOGRAPHIC MACHINE

This invention relates to an electronic control, in particular to a control manager for handling system interrupts.

For further information relating to this application, reference is made to the following companion U.S. patent applications filed to the common assignee U.S. Ser. No. 420,965 (now U.S. Pat. No. 4,589,090), Remote Process Crash Recovery; U.S. Ser. No. 420,988, Process Scheduler in an Electronic Control; U.S. Ser. No. 420,991, Distributed Processing Environment Fault Isolation; U.S. Ser. No. 420,992, Common Control in Multiple Processors By Chaining Tasks; U.S. Ser. No. 420,993 (now U.S. Pat. No. 4,475,156), Virtual Machine Control; U.S. Ser. No. 420,994, Task Control Manager; U.S. Ser. No. 420,995 (now U.S. Pat. No. 4,521,847), Control System Job Recovery After a Malfunction; U.S. Ser. No. 420,999, Separate Resetting of Processors in a Multiprocessor Control; U.S. Ser. No. 421,006 (now U.S. Pat. No. 4,550,382), Filtered Inputs; U.S. Ser. No. 421,007 (now abandoned), Multiprocessor Control Synchronization and Instruction Downloading; U.S. Ser. No. 421,008, Multiprocessor Memory Map; U.S. Ser. No. 421,009, Changing Portions of Control in a ROM Based System; U.S. Ser. No. 421,010 (now U.S. Pat. No. 4,532,584), Race Control Suspension; U.S. Ser. No. 421,011 (now U.S. Pat. No. 4,514,846), Control Fault Detection for Machine Recovery and Diagnostics Prior to Malfunction; U.S. Ser. No. 421,016 (now U.S. Pat. No. 4,580,232), Single Point Microprocessor Reset; and U.S. Ser. No. 421,615, Control Crash Diagnostics.

Interrupts in a machine control system are asynchronous events which cause the control system to suspend the immediate operation or original task and vector to a certain section of code. Since the original task or code that was executing was in the middle of an atomic operation or operating system instruction, it is often necessary for the control system to spend a significant amount of time saving status so that it can return to the original task. Often times the saving of information and maintaining status can be a time consuming and inefficient operation in a control involving various interrupts. It would be desirable, therefore, to provide an interrupt system that minimizes the amount of time needed to save status and to respond to various interrupts.

In general, prior art controls are a combination of hardware and software. Usually, the hardware forms the base of control, comprising at least one microprocessor and various other logic controls to handle functions such as interrupts, communications and timing. Superimposed on the hardware configuration is the controlling software. Often the software comprises several blocks of software modules, also handling various functions such as the interrupts, the communications and the timing.

A difficulty, however, with the prior art control systems is that often the software is extremely complex due to the limited range of the instruction set of the underlying hardware. It would be desirable, therefore, to be able to customize the underlying microprocessor instruction set to a specific application. That is, it would be desirable to extend the instruction set of the resident microprocessor.

As control functions become standardized, instruction sets can be extended by implementing in hardware functions that were previously implemented in software. However, hardware modification is often costly and time consuming. Other problems of prior art controls have been the difficulty of supporting a high level concurrent language, a lack of modularity in the control kernel, a general lack of powerful constructs or mechanisms, and a lack of an effective structure to support interpretive interface. It would be desirable, also, to provide a machine control that is flexible and more comprehensible to a programmer uninterested in machine details. In other words, it would be desirable to provide a control that cloaks the machine, effectively insulating the machine applications programmer from hardware involvement.

It is, therefore, an object of the present invention to provide a new and improved interrupt control. It is a further object of the present invention to provide an interrupt manager that is isolated from the underlying microprocessor, and provides an extension of the instruction set of the underlying microprocessor hardware. It is a still further object of the present invention to provide an interrupt manager that suspends an interrupt until after completion of an atomic operation to minimize the necessity of saving status.

Further advantages of the present invention will become apparent as the following description proceeds, and the features characterizing the invention will be pointed out with particularity in the claims annexed to and forming a part of this specification.

Briefly, the present invention is an interrupt manager for servicing interrupts. An interrupt is performed only after an atomic operation (Operating System instruction) is completed. After completion of each operating system instruction, a first command immediately allows any interrupt to be serviced. A second command then immediately closes out any interrupts, allowing for the execution of the next operating system instruction.

For a better understanding of the present invention reference may be had to the accompanying drawings wherein the same reference numerals have been applied to like parts and wherein:

FIG. 12 shows in more detail the PIC macro shown in FIG. 11.

For more details of the timing, reference is made to Copending Application U.S. Ser. No. 420,993, incorporated herein.

Figure 1:
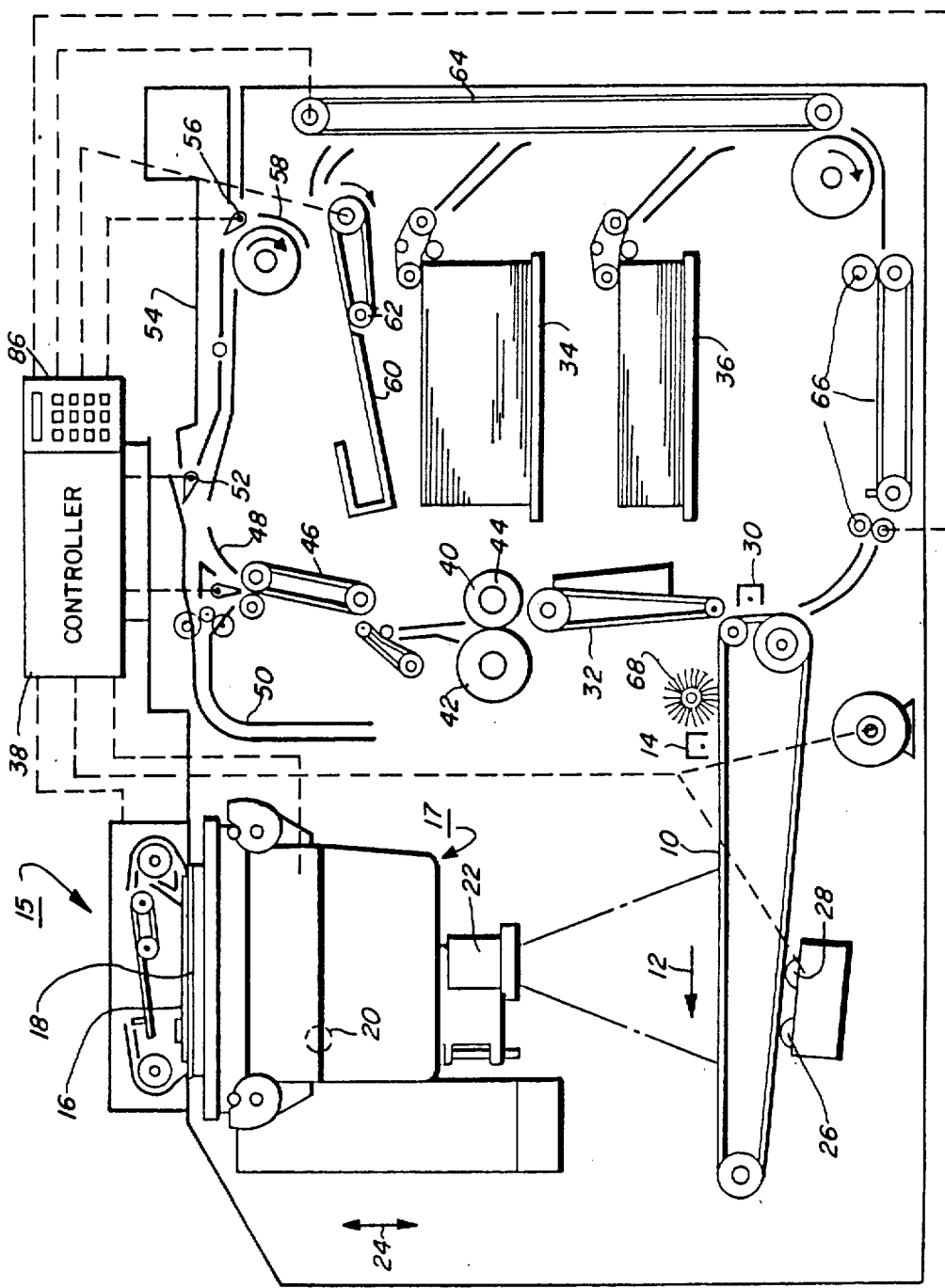
FIG. 1 is an elevational view of a reproduction machine typical of the type of machine or process that can be controlled in accordance with the present invention.

With reference to FIG. 1, there is shown an electrophotographic printing or reproduction machine employing a belt 10 having a photoconductive surface. Belt 10 moves in the direction of arrow 12 to advance successive portions of the photoconductive surface through various processing stations, starting with a charging station including a corona generating device 14. The corona generating device charges the photoconductive surface to a relatively high substantially uniform potential.

The charges portion of the photoconductive surface is then advanced through an imaging station. At the imaging station, a document handling unit 15 positions an original document 16 facedown over exposure system 17. The exposure system 17 includes lamp 20 illuminating the document 16 positioned on transport platen 18. The light rays reflected from document 16 are transmitted through lens 22. Lens 22 focuses the light image of original document 16 onto the charged portion of the photoconductive surface of belt 10 to selectively dissipate the charge. This records an electrostatic latent image on the photoconductive surface corresponding to the informational areas contained within the original document.

Platen 18 is mounted movably and arranged to move in the direction of arrows 24 to adjust the magnification of the original document being reproduced. Lens 22 moves in synchronism therewith so as to focus the light image of the original document 16 onto the charged portion of the photoconductive surface of belt 10.

Document handling unit 15 sequentially feeds documents from a holding tray, in seriatim, to platen 18. The document handling unit recirculates documents back to the stack supported on the tray. Thereafter, belt 10 advances the electrostatic latent image recorded on the photoconductive surface to a development station.

At the development station a pair of magnetic brush developer rollers 26 and 28 advance a developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to the transfer station. At the transfer station a copy sheet is moved into contact with the toner powder image. The transfer station includes a corona generating device 30 which sprays ions into the backside of the copy sheet. This attracts the toner powder image from the photoconductive surface of belt 10 to the sheet.

The copy sheets are fed from a selected one of trays 34 to 36 to the transfer station. After transfer, conveyor 32 advances the sheet to a fusing station. The fusing station includes a fuser assembly for permanently affixing the transferred powder image to the copy sheet. Preferably, fuser assembly 40 includes a heated fuser roller 42 and backup roller 44 with the sheet passing between fuser roller 42 and backup roller 44 with the powder image contacting fuser roller 42.

After fusing, conveyor 46 transports the sheets to gate 48 which functions as an inverter selector. Depending upon the position of gate 48, the copy sheets will either be deflected into a sheet inverter 50 or bypass sheet inverter 50 and be fed directly onto a second gate 52. Decision gate 52 deflects the sheet directly into an output tray 54 or deflects the sheet into a transport path which carries them on without inversion to a third gate 56. Gate 56 either passes the sheets directly on without inversion into the output path of the copier, or deflects the sheets into a duplex inverter roll transport 58. Inverting transport 58 inverts and stacks the sheets to be duplexed in a duplex tray 60. Duplex tray 60 provides intermediate or buffer storage for those sheets which have been printed on one side for printing on the opposite side.

In order to complete duplex copying, the previously simplexed sheets in tray 60 are fed seriatim by bottom feeder 62 back to the transfer station for transfer of the toner powder image to the opposed side of the sheet. Conveyers 64 and 66 advance the sheet along a path which produces a sheet inversion. The duplex sheets are then fed through the same path as the previously simplexed sheets to be stacked in tray 54 for subsequent removal by the printing machine operator.

Invariably after the copy sheet is separated from the photoconductive surface of belt 10, some residual particles remain adhering to belt 10. These residual particles are removed from the photoconductive surface thereof at a cleaning station. The cleaning station includes a rotatably mounted fibrous brush 68 in contact with the photoconductive surface of belt 10. A controller 38 and control panel 86 are also illustrated in FIG. 1. The controller 38, as represented by dotted lines, is electrically connected to the various components of the printing machine.

Figure 2:
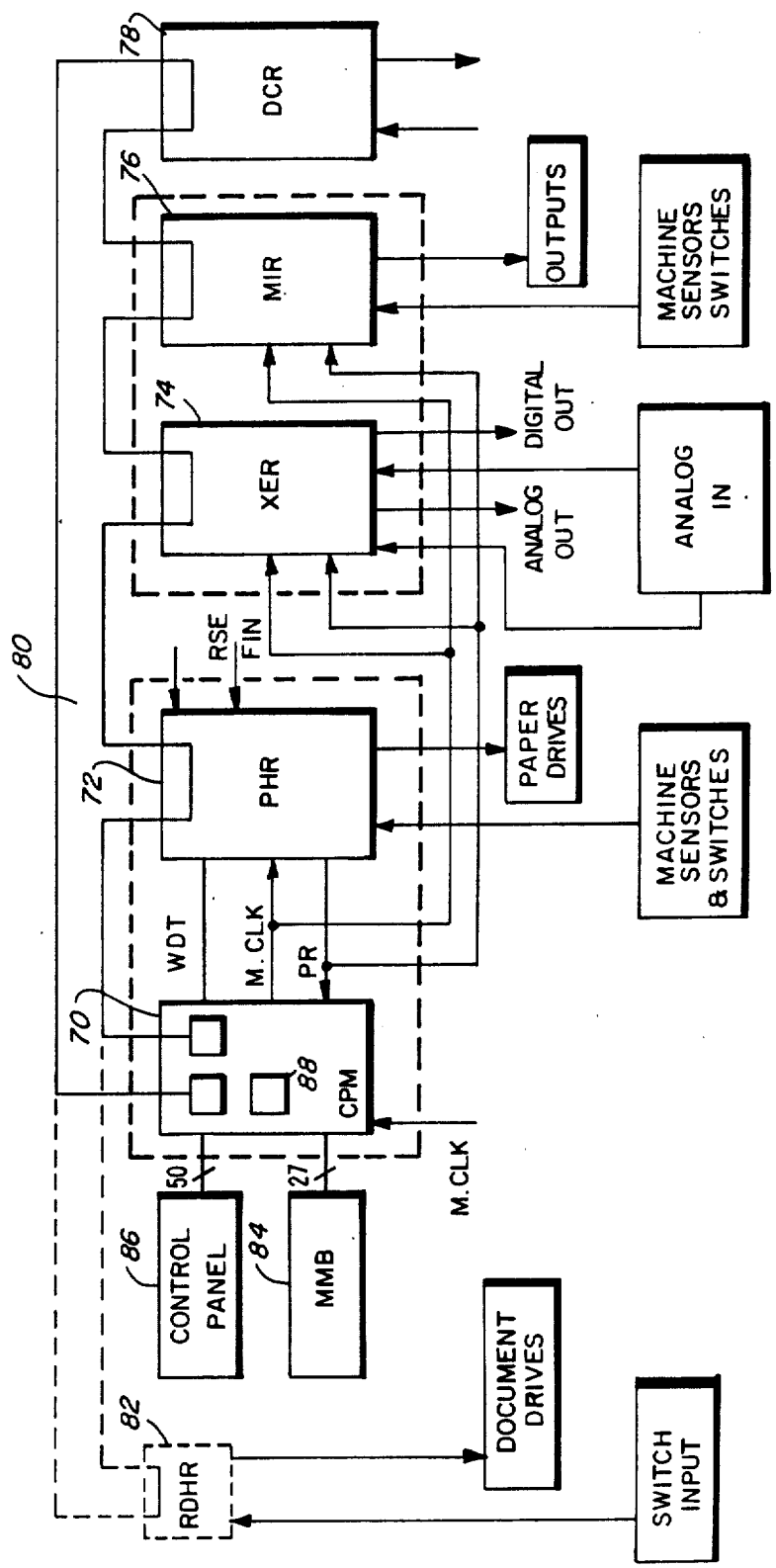
FIG. 2 is a block diagram of the control boards for controlling the machine of FIG. 1.

With reference to FIG. 2, there is shown a first level of control architecture of controller 38 illustrated in FIG. 1. In particular, there is shown a Central Processing Master (CPM) control board 70 for communicating information to and from all the other control boards, in particular the Paper Handling Remote (PHR) control board 72 controlling the operation of all the paper handling subsystems such as paper feed, registration and output transports.

Other control boards are the Xerographic Remote (XER) control board 74 for monitoring and controlling the xerographic process, in particular the digital signals; the Marking and Imaging Remote (MIR) control board 76 for controlling the operation of the optics and xerographic subsystems, in particular the analog signals. A Display Control Remote (DCR) control board 78 is also connected to the CPM control board 70 providing operation and diagnostic information on both an alphanumeric and liquid crystal display. Interconnecting the control boards is a shared communication line 80, preferably a shielded coaxial cable or twisted pair similar to that used in a Xerox Ethernet ® Communication System. For a more detailed explanation of an Ethernet ® Communication System, reference is made to Copending Applications U.S. Ser. No. 205,809, now abandoned; U.S. Ser. No. 205,822, now abandoned and U.S. Ser. No. 205,821, now abandoned, all filed Nov. 10, 1980 and incorporated herein as references.

Other control boards can be interconnected to the shared communication line 80 as required. For example, a Recirculating Document Handling Remote (RDHR) control board 82 (shown in phantom) can be provided to control the operation of a recirculating document handler. There can also be provided a not shown Semi-Automatic Document Handler Remote (SADHR) control board to control the operation of a semi-automatic document handler, a not shown Sorter Output Remote (SOR) control board to control the operation of a sorter, and a not shown Finisher Output Remote (FOR) control board to control the operation of a stacker and stitcher.

Each of the controller boards preferably includes an Intel 8085 microprocessor with suitable RAM and ROM memories. Also interconnected to the CPM control board is a Master Memory Board (MMB) 84 with suitable ROMs to control normal machine operation and a control panel board 86 for entering job selections and diagnostic programs. Also contained in the CPM board 70 is suitable nonvolatile memory. All of the control boards other than the CPM control board are generally referred to as remote control boards.

In a preferred embodiment, the control panel board 86 is directly connected to the CPM control board 70 over a 70 line wire and the memory board 84 is connected to the CPM control board 70 over a 36 line wire. Preferably, the Master Memory Board 84 contains 56K byte memory and the CPM control board 70 includes 2K ROM, 6K RAM, and a 512 byte nonvolatile memory. The PHR control board 72 includes 1K RAM and 4K ROM and preferably handles 29 inputs and 28 outputs. The XER control board 74 handles 24 analog inputs and provides 12 analog output signals and 5 digital output signals and includes 4K ROM and 1K RAM. The MIR board 76 handles 13 inputs and 17 outputs and has 4K ROM and 1K RAM.

As illustrated, the PHR, XER and MIR boards receive various switch sensor information from the printing machine and provide various drive and activation signals, such as to clutches and lamps in the operation of the printing machine. It should be understood that the control of various types of machines and processes are contemplated within the scope of this invention. For further information on the control reference is made to Copending application Ser. No. 420,993, now U.S. Pat. No. 4,475,156 and Copending application Ser. No. 421,007, still pending incorporated herein.

Figure 3:
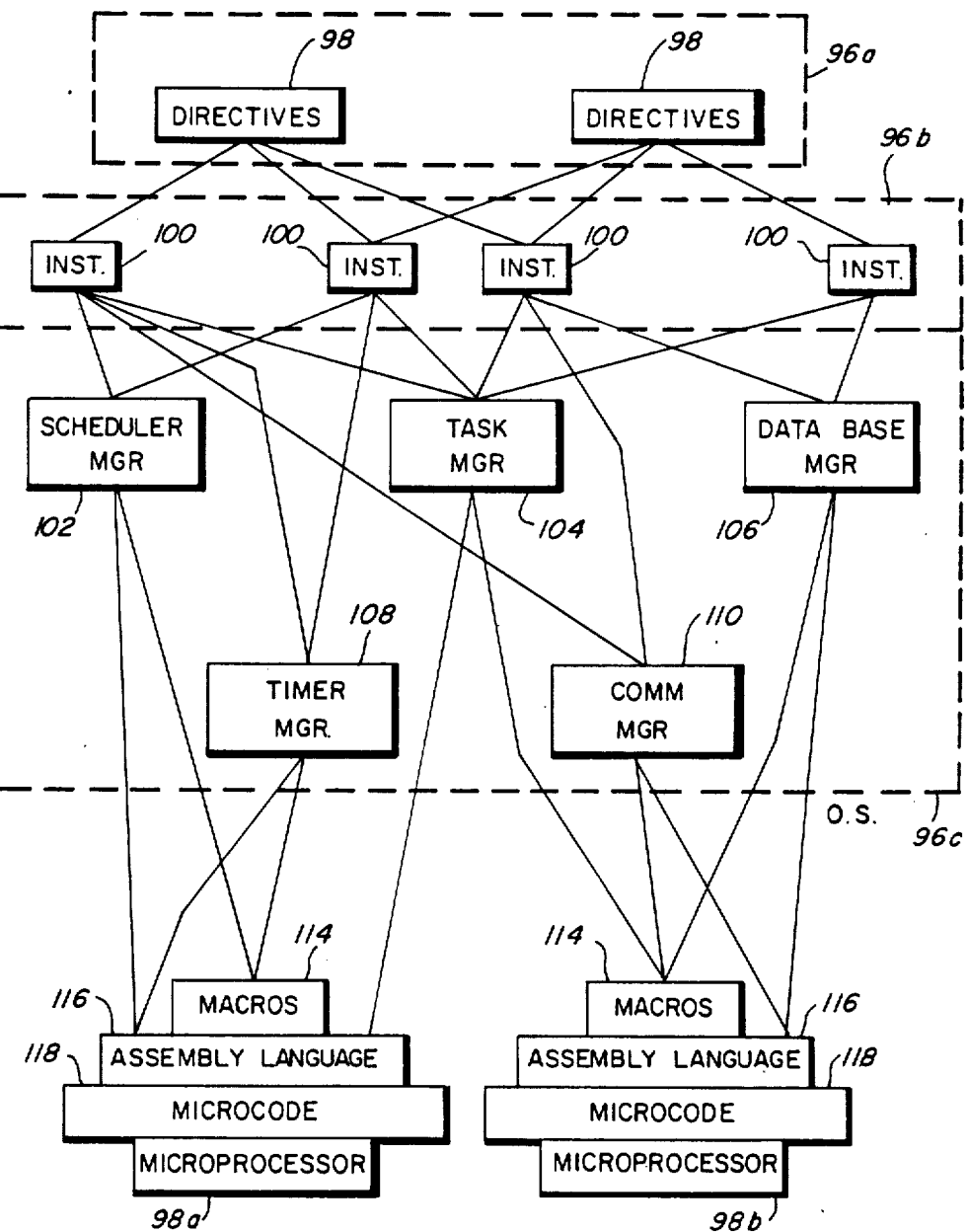
FIG. 3 illustrates a second level of control architecture.

With reference to FIG. 3, the Operating System is presented with a plurality of Directives 98. These directives call upon one or more decoders or Instruction Modules 100. In turn, the Instruction Modules 100 invoke one or more Primitives. In particular, the Primitives are a Scheduler Manager 102, a Task Manager 104, a Data Base Manager 106, a Timer Manager 108 and a Communication Manager 110. In turn, the Primitives communicate with the various microprocessors 98a, 98b through the macros 114, the assembly language 116 and the microcode 118 of the microprocessors 98a, 98b. The invoking of Instruction Modules and Primitives is illustrated in FIG. 3 by the solid lines connecting the Directives (98), Instruction Modules (100) and Primitives (102, 104, 106, 108, 110). It should be noted that each of the microprocessors 98a and 98b is suitably connected to suitable RAM and ROM memories as well as with other microprocessors.

Directives corresponding to macros in a physical machine (microprocessor) architecture are top level of the operating control. The Directives illustrated generally as 96a shield the Operating System structure from changes in the compiler, allow for changes in the Operating System internal structure and abstract out from the compiler unnecessary Operating System details. Instruction Modules illustrated generally as 96b and Primitives illustrated generally as 96c make up the Operating System. Instruction Modules are the middle level and correspond to assembly language instructions in a physical machine. They are the smallest executable, nonpreemptive unit in the virtual machine. Preemption is similar to a physical machine interrupt capability except that a physical machine allows basically two concurrent processes or tasks (foreground or background) whereas the virtual machine allows an almost unlimited number of tasks executing in one or more physical processors.

The Primitives are the lowest level in the Operating System. They correspond to the microcode of a microprocessor. It is the function of the Primitives to implement the basic building blocks of the Operating System on a microprocessor and absorb any changes to the microprocessor. In general, Directives call upon one or more Instruction Modules which in turn invoke one or more of the Primitives to execute a task or process.

Preferably, the Instruction Modules 100 and the Primitives 102, 104, 106, 108 and 110 comprise software in silicon. However, it should be understood that it is within the scope of the present invention to implement the Instruction Modules and Primitives in hardware. They are building blocks in an overall control system. In particular, the Instruction Modules and Primitives generally provide a set of real time, multitasking functions that can be used generically across different implementations of the microprocessors. In a machine or process control, the Instruction Modules and Primitives are extensions of the instruction set of the microprocessor. The micrprocessor with its original set of Instruction Modules acts as a kernel, and the software and silicon or firmware acts as a shell.

Figure 4:
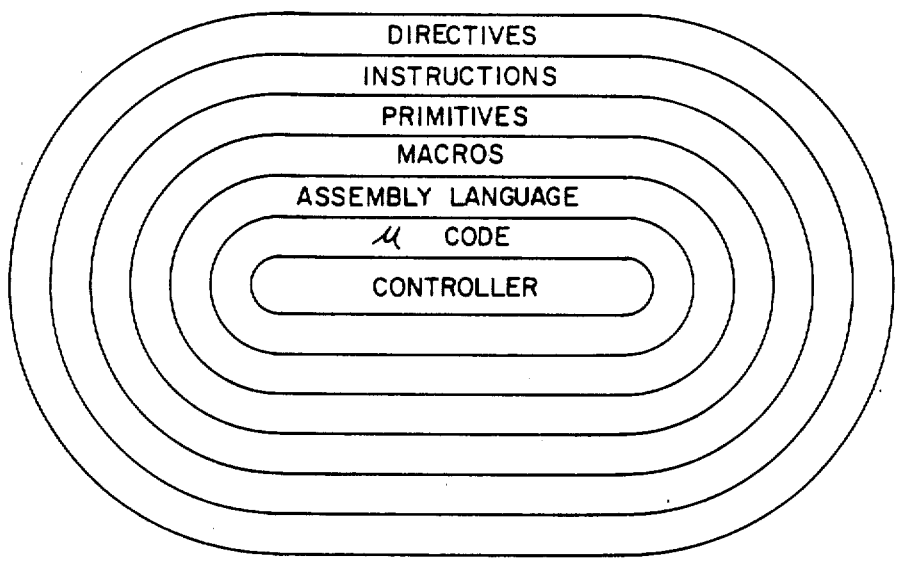
FIG. 4 is an illustration of the relationship of the first and second levels of control.

The machine control can be viewed as a nesting or overlay of successively higher levels of control as shown in FIG. 4. At the lowest level, is the microprocessor or controller responding to the microcode, assembly language and macros. Overlaying this physical machine is the virtual machine comprising the Primitives and Instruction Modules responding to Directives. In effect, the Primitives break down the high level Directives and Instruction Modules into a level for the microprocessor to perform.

An Instruction Module 100 in the operating system is known as a slice and one Instruction Module is given 500 microseconds to execute. The Instruction Modules are the smallest executable nonpreemptive units in the virtual machine. Preemption is similar to the microprocessor interrupt capability except that a microprocessor allows basically two concurrent processes (foreground and background). On the other hand, the virtual machine or Operating System allows an almost unlimited number of executions of concurrent processes or tasks in one or more of the microprocessors.

That is, the Operating System can begin several tasks in sequence by using the START instruction. Once each task is activated, it must wait its turn to have its next instruction executed. However, many tasks are active at the same time and being executed concurrently. By a process or task is merely meant any block of code that is executed by a microprocessor. These blocks of code provide computations, housekeeping or direct control of the process or machine under control.

The Primitives are the lowest level in the Operating System. Primitives do not allow for implicit preemption and it is the function of the Primitives to implement the basic building blocks of the Operating System on a physical machine (microprocessor) and absorb any changes to the physical machine. Each of the Primitives is further broken down into sublevels known as primitive operations to carry out the operations of the particular manager.

The portion of the Operating System residing in the CPM board 70 is known as the Dynamic Operating System (DOS). As an example of memory allocation, in the CPM board 70, there is preferably 6K bytes of RAM for tables, 8K bytes of ROM for the Operating System, and 48K bytes of ROM for the application programs.

The Operating System sets up various RAM tables throughout the system. Portions of the RAM associated with each of the control boards are allocated space for various initializing and run time control information of the Operating System. Each of the Primitives is responsible for maintaining information in the RAM necessary to synchronize and coordinate the overall control of the machine or process. For example, the Scheduler Manager 102 sets up a table in RAM preferably on the CPM board 70 defining the sequence or schedule of the completing of tasks or processes. It determines the priority of execution of the various scheduled tasks. A task or process that has been suspended or is waiting is not scheduled. However, once the event occurs that the task is waiting for, the task is then scheduled for execution.

The Task Control Manager 104 is the Primitive that keeps track of the status of a particular process or task. It determines how the various operations are to be performed. For example, a particular task may require several Instruction Modules invoking many different Primitive operations. The Task Control Manager keeps a table in RAM on appropriate control boards of the status of each of the tasks. The Data Base Manager 40 keeps track of the variables or constants or other information that are required to complete a task. This data is stored in a portion of RAM called a stack associated with each of the tasks.

Thus, for each task to be completed, the task itself must be scheduled by the Scheduler Manager 102, the status of the particular task is kept track of by the Task Control Manager 104 and any data required to complete the task is provided by the Data Base Manager 106. The Timer Manager 108 Primitive provides the necessary timing control for each task and the Communications Manager 110 Primitive provides the communications between the various control boards, preferably over a shared line.

As an example of how the Operating Systems operates, it is often required in the control of the printing machine to suspend or delay an operation for a set period of time. If a delay of 200 milliseconds is required, a Directive WAITR; 200 is used. This Directive invokes the Instruction Module $WAIT in turn invoking the Primitive operations:
START TIMER
SUSPEND TASK
EXECUTE NEXT TASK which provide a 200 millisecond delay.

That is, an operation application code (control code in ROM) calls in a Directive. The Directive invokes one or more Instruction Modules 100. For example, if the application code calls in a WAIT DIRECTIVE, the WAIT Instruction Module will be invoked.

In turn, the WAIT Instruction Module will invoke the Timer Mananger and Scheduler Manager which in turn provide the Primitive operation to complete the task. Once the WAIT Directive has been disseminated to the proper Primitives for execution, the Instruction Module can accept another Directive.

Essential to the Operating System control is a set of processes or tasks that can be executed. The control of the printing machine is dependent upon the proper scheduling and timely execution of these tasks. The activation of lamps, clutches, motors and response to various sensors and conditions is accomplished through the completion of the predetermined tasks. A given number of tasks are active at any one time and the Operating System concurrently executes these active tasks. Many tasks are related to other tasks. The Operating System supports full process control by means of Instruction Modules that invoke a process or task and maintain a thread of control with that process or invoke a task and maintain no linkages. Therefore, various Instruction Modules or procedures are provided by the Operating System to maintain links between related tasks.

Thus, a START instruction or procedure spawns a completely independent task while a FORK procedure spawns a related task termed a Child. This Child becomes a member of the invoking task's family, also known as the Parent. Whenever a task is invoked by another task through a CALL procedure, the CALLing task is suspended (though still active) and the CALLed task becomes an active Child of the CALLing task.

Figure 5:
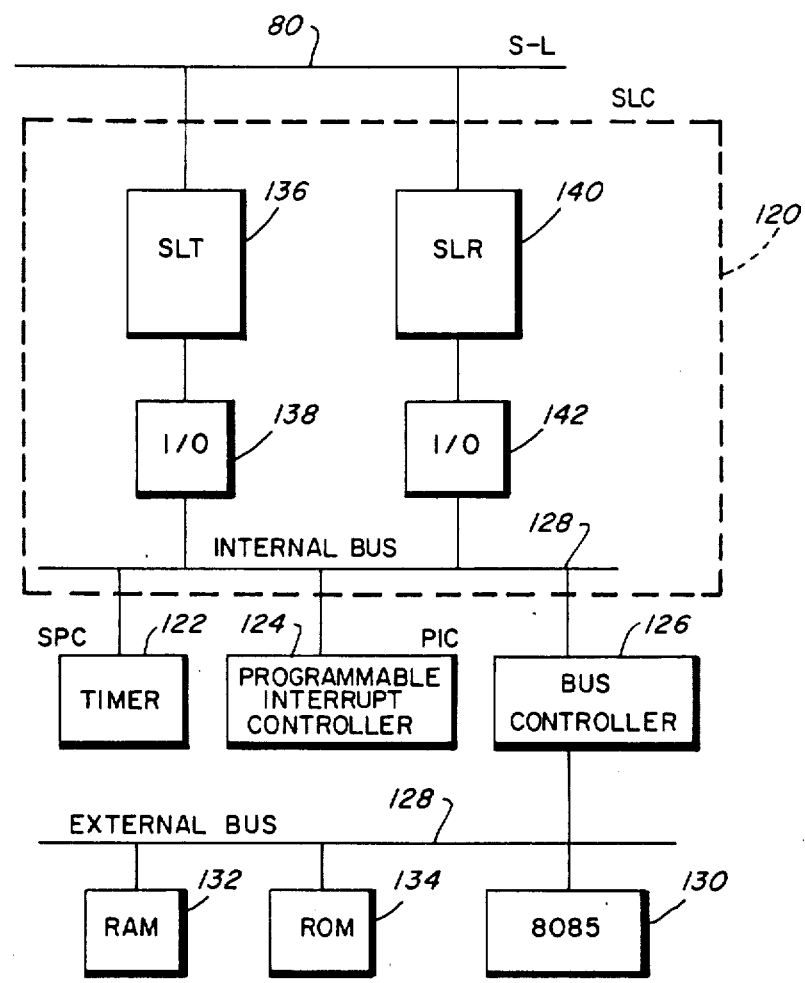
FIG. 5 illustrates the communication hardware resident on each of the control boards shown in FIG. 2.

With reference to FIG. 5, there is shown the communication hardware resident on each of the controller boards 70, 72, 74, 76, 78 and 82 for communication over the shared line 80. In particular, there is illustrated a Shared Line Controller (SLC) 120, a Small Programmable Controller (SPC) or Timer 122, a Programmable Interrupt Controller (PIC) 124 and a bus controller 126 connected to an internal bus 128 on the SLC 120. The bus controller 126 connects the communication hardware with the external bus 128, the Intel 8085 microprocessor 130, Random Access Memory 132 and Read Only Memory 134 resident on each of the controller boards. The Shared Line Controller (SLC) 120 further comprises a Shared Line Transmitter 136 and associated input/output processor 138 interconnected to the shared line 80 and the internal bus 128 and a Shared Line Receiver 140 with associated input/output processor 142, also connected to the shared line 80 and the internal bus 128.

The Shared Line Receiver (SLR) 140 and the Shared Line Transmitter (SLT) 136 are silicon macros for serial communications on the shared line 80. The communication scheme uses the principles of the Xerox Ethernet system. The Shared Line Transmitter SLT 136 under the control of the input/output processor 138 converts parallel data from RAM 132 to serial bits and places them on the shared line 80. The Shared Line Receiver (SLR) 140 reverses the process and also monitors the shared line 80 for activity.

The SLR 140 in general detects a carrier on the line and notifies its associated SLT 136. This causes the SLT 136 to defer transmitting until the line is quiet. The SLR 140 also detects a collision on the line, meaning that another station is also attempting to transmit. It then notifies its associated SLT 136 to absorb its own transmission and jams the line long enough to be certain that all SLRs 140 on the line have detected the condition. The SLR 140 also matches the destination address at the head of the incoming message to its own identification address. In addition, it recognizes the address designated for broadcast to all receivers. If the SLR 140 is in the promiscuous mode (instructed to receive all messages), it accepts the bit serial message, performs a cyclic redundancy checksum, converts the message to bit parallel data, and passes the data via associated I/O processor to RAM 132.

The use of the SLR/SLT pairs permits packets of digital data to be communicated among control boards. This communication enables control boards in various parts of the machine or a set of machines to supervise a local function while maintaining coordination with other control boards. Each SLR/SLT station is independent of other stations. There is no central control that might become a bottleneck, so far as access to the shared line 80 is concerned. If two or more stations attempt access at the same time, both "back off" for randomly determined periods of time, so that their next access tries will take place at different times.

Since the SLR/SLT stations are independent of each other, failure of one station does not affect other stations or the shared line. The rest of the system continues to operate without the failed unit. A particular SLR/SLT pair can communicate to any other station on the shared line by using its unique identification address or it can broadcast to all stations by using a common address designated for this purpose.

Each receiver ignores communications not addressed (or broadcast) to it, except that, in the promiscuous mode, a receiver can intercept all messages. Thus, a designated receiver can be employed to provide a record of all activity on the shared line for use in troubleshooting. The shared line 80 is the medium for communicating among a number of control boards, each containing a processor. The shared line itself is preferably a twisted pair, although other media, such as coaxial cable, can be employed. The shared line is accessed by the Shared Line Receiver 140 and the Shared Line Transmitter 136 on each control board. The message is a bit-serial digital data packet, preceded by a start bit, destination address, and source address.

Control of access to the shared line rests with each receiving and transmitiing station. A station with a message ready to transmit defers to a transmission already in progress. A station may initiate a transmission only when the shared line 80 is clear. The first byte of each message is the destination address and the second byte, the source address. A packet placed on the shared line propagates to all receivers, but is accepted only under the following conditions:

(1) the destination address matches the receiver's identification address, or (2) the destination address is zero, the address designated by convention for a broadcast message to all receivers, or (3) the receiver is set to receive all messages.

For one station to be able to defer to another, it must be able to detect the presence of a message on the shared line. In the transmission methods employed, phased encoding, there is at least one transition from one logic level to the other in each bit period. The fact that a message is present, therefore, can be detected every bit period by the occurrence of a transmission.

In a system with carrier detection, collisions are minimized, because a transmitter defers accessing the line when it is in use. Thus, collisions can occur only when several stations are waiting for the line to become available and begin transmitting at about the same time it does.

Each operation of the SLR 140 or SLT 136 is determined by a command placed in a Command Control Block (CCB) in RAM 132. The Command Control Block is transferred from RAM 132 to the I/O processor 138 or I/O processor 142, respectively, and is there implemented by means of signals to suitable interfaces. Before a message transfer operation, the identification address in the SLR 140 may be modified and the mode of operation of the SLR 140 or SLT 136 is established. Following the message transfer operation, the SLR 140 or SLT 136 returns status information to its associated processor 138 or 142.

There are various four-bit commands affecting the SLR 140, SLT 136, or both, such as:

Receive Message(0000)—Causes the SLR 140 to receive a message from the shared line 80 bearing the destination address or the broadcast address and to pass it on to an I/O processor 138 buffer.

Load ID Register (1100)—Causes the contents of the location pointed to by the memory address of the Command Control Block (CCB) to be transferred to an identification address register on the SLR 140.

Transmit Message (0101)—Causes the SLT 136 to transmit a message packet of 256 bytes or less, i.e., a message up to the length capable of being specified by a single CCB. In the case of chained CCBs, this command must be contained in the last CCB of the chain.

Transmit Segmented Message (0100)—Causes SLT 136 to transmit as a single message packet the data supplied by a chain of CCBs. The data from the area of memory pointed to by each successive CCB is added contiguously to the data from the previous memory area.

For message reception the byte count in the CCB is normally set to zero, causing an I/O processor 142 byte counter to be initialized at zero count. As a message is received, the byte counter increments. At the end of the message, the byte counter contains and reports the number of bytes received. For message transmission, the byte count in the CCB is normally set to indicate the message length in bytes. As the message is transmitted, an I/O processor 138 byte counter decrements. At the completion of message transmission, the byte counter should have reached a zero count.

Figure 6:
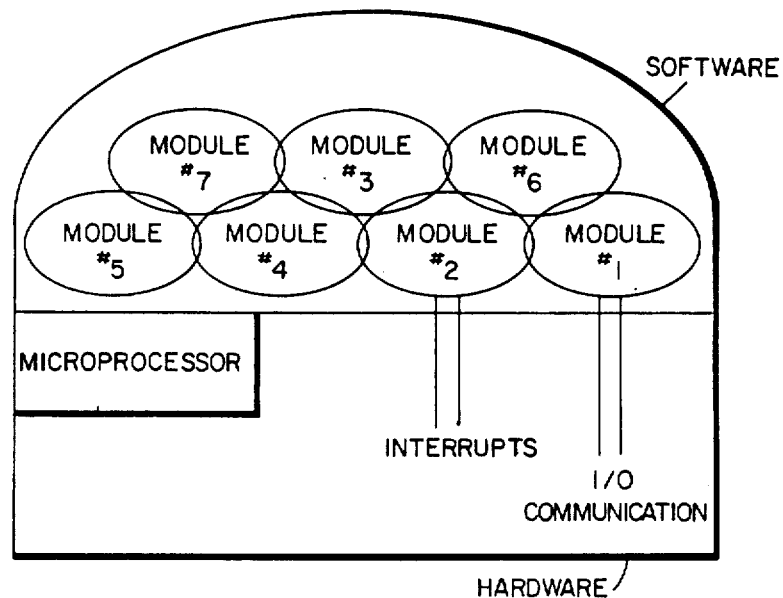
FIG. 6 represents a prior art configuration of the hardware/software relationship to control communications and timing between control boards.

In general, prior art communication controls are a combination of hardware and software. FIG. 6 is an illustration of a typical hardware/software configuration. In particular, the hardware, forming the base of the control, comprises a microprocessor and various other logic controls to handle various functions such as interrupts and input/output communication as shown. Superimposed upon this hardware configuration is the controlling software, often comprising several blocks of software modules (illustrated as seven modules) handling various functions such as the interrupts, in the input/output communication and the overall system. The interaction of the software modules is often a function of the underlying hardware and the sophistication and complexity of the control.

Figure 7:
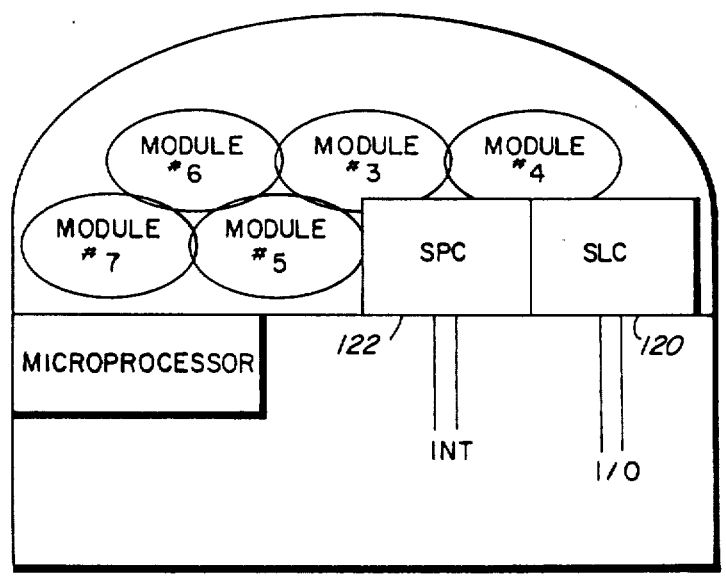
FIG. 7 represents the configuration of FIG. 6 with selected software modules replaced by the silicon macros Shared Logic Controller SLC and Small Programmable Controller SPC.

As control functions become standardized, it is often desirable to implement, in hardware, functions that previously resided in software, as illustrated in FIG. 7.

In particular, the module 1 and module 2 software of the software system of FIG. 6 are now implemented by hardware or chip configurations identified as SPC 122 and SLC 120, also illustrated in FIG. 3. Thus, rather than implementing in software various functions of the control, it is often advantageous to implement in hardware some of these software functions and thus minimize the complexity of the software. In effect, SPC 122 and SLC 120 macros are an extension of the instruction capability of the instruction set of the microprocessor.

Figure 8:
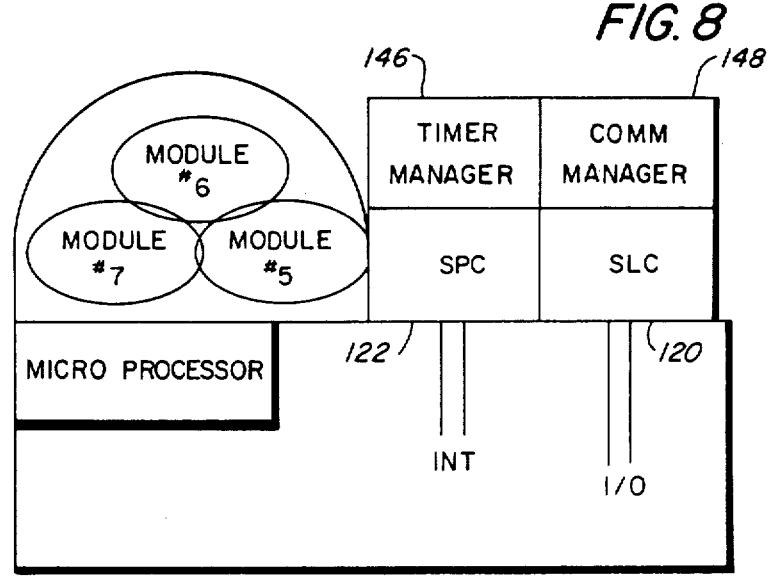
FIG. 8 represents the configuration of FIG. 7 with selected software modules replaced by a timer manager and a commmunication manager.

In accordance with one aspect of the present invention, as shown in the next FIG. 8, the Timer Manager 146 and Communication Manager 148 are further extensions of the instruction set of the resident microprocessor. The Timer Manager 146 and Communication Manager 148 are software-on-silicon building blocks to extend the microprocessor instruction set. The Timer Manager and Communications Manager add another layer of control and provide a real time multitask capability. The Timer Manager 146 and Communications Manager 148 further customize the control to a specific application. By extending the instruction set, the control in effect moves closer to the specific application. The Timer Manager and Communication Manager can be viewed as a means of overcoming the shortcomings of a proven architecture in the light of a particular application.

Figure 9A:
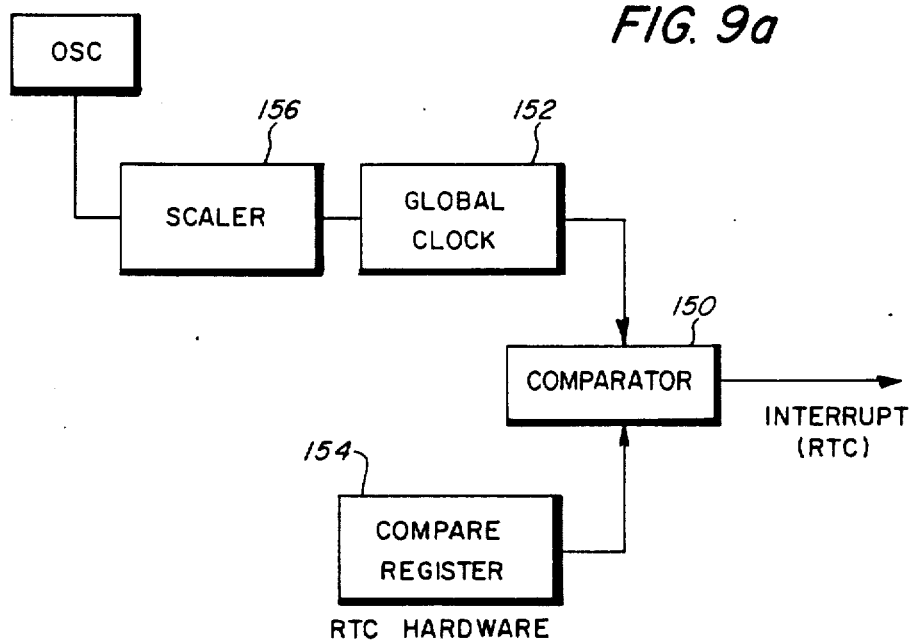
FIGS. 9a and 9b show in more detail the SPC macro shown in FIG. 7.
Figure 9B:
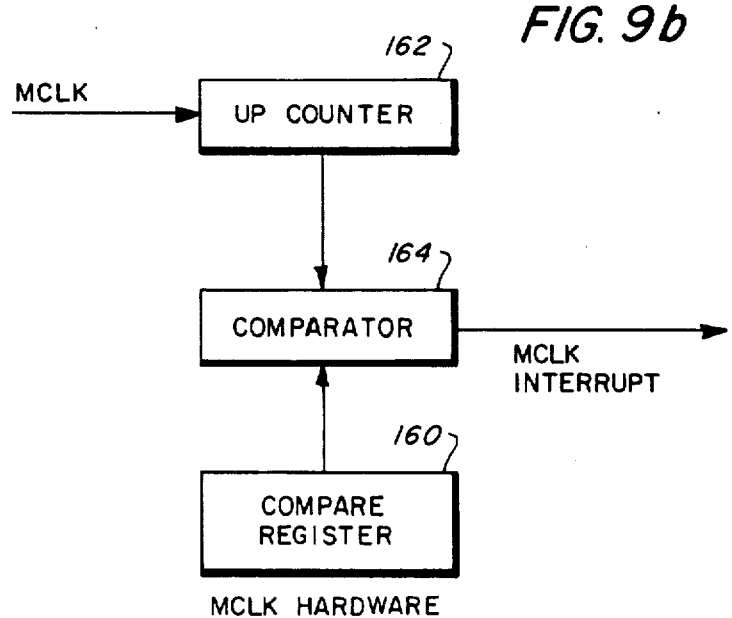

With reference to FIGS. 9a and 9b, there are shown details of the programmable controller SPC or timer 122. The timer 122 comprises various circuits for providing timer interrupts. In particular, with reference to FIG. 9a, there is shown the Real Time Clock (RTC) hardware. A comparator 150, receiving inputs from a global clock 152 and a compare register 154 provides the Real Time Clock interrupt. The compare register 154 holds the desired Real Time Clock data and the global clock 152 receiving oscillator signals through a scaler 156 provides a continuous Real Time Clock pulse. Once the global clock 152 counts up to the values stored in the compare register 154, the comparator provides the interrupt signal.

There is also shown the Machine Clock interrupt hardware in FIG. 9b. In particular, the register 160 holds the desired Machine Clock delay or time period. The Machine Clock pulses, MCLK, are counted in an up counter 162. The comparator 164 receives the signal from the up counter 162 and the signal from the register 160 and upon determining equality, the comparator 164 provides the Machine Clock interrupt signal.

For example, assume the Real Time Clock hardware is instructed to wait 100 milliseconds. Since the Real Time Clock is continually counting Real Time Clock pulses, at the time of this instruction, there is already a Real Time Clock value stored in the global clock 152. Assuming there is a count of 1000 stored in the global clock 152 and a delay of 100 milliseconds is requested, the 100 will be added to the 1000 and a result stored in the compare register 154. These procedures are done under the direction of the Timer Manager 146. Once the count 1100 has been stored in the compare register 154, the Timer Manager 146 will suspend this particular task and vector control to another task within the control system needing execution. However, once the global clock 152 counts up to 1100, the comparator 150 will read the correspondence between the global clock and the compare register and generate the Real Time Clock interrupt to proceed with the execution of the task waiting for the 100 millisecond delay. At this point, the Timer Manager 146 will go on to another task.

A Machine Clock interrupt operates in a similar manner. Assume, for example, there is an instruction to wait 200 machine clocks to perform a specific task. Since the up counter 162 is continually counting Machine Clock pulses, there will at this time already be a count in the up counter 162, for example, a count of 500. The value in the up counter 500 plus the 200 machine clock delay count will be added together and the result placed in the register 160. Thus, a count of 700 will be placed in the register 160. Once the up counter 162 counts up to the value in the register 160, in this case 700, the comparator 164 will generate the Machine Clock interrupt to proceed to the task waiting for the 200 machine clock delay. These operations are under control at the Timer Manager.

Now assume, for example, that after 100 machine clock counts, that is the up counter 162 is up to a count of 600, a request is received for a 50 machine clock suspension. This suspension, therefore, would terminate after 650 total machine clock pulses in the up counter 162. This count will be reached prior to the 700 machine count required for the first suspension request. To handle this type of operation, the Timer Manager 146 merely takes the 600 count already in the up counter and adds the 50 machine clock count to the first of the interrupts to be provided. Once the count of 650 has been reached, a Machine Clock interrupt signal is generated to execute the task waiting for the 50 machine clock delay. However, at this point, the first requested suspension for a 200 machine clock delay still needs an additional 50 machine clock pulses to proceed with the execution of that task. Therefore, the Timer Manager takes the present value in the up counter 162 and adds the additional 50 to the up counter for a total of 700 and places this value in the register 160. Upon reaching 700, a Machine Clock interrupt signal will be generated to execute the task waiting for the 200 machine clock delay.

The Timer Manager 146 generally controls the time suspension of tasks. As shown, the current value of a global clock or up counter is added to the task suspend interval. This interval is then loaded into a register and a comparator looks for the equivalents of the value in the counter and the register. The equivalents then generates the desired interrupt signal.

Generally, tasks are suspended for the following reasons:

(1) The task is waiting for an input, that is, a register finger or a front panel command, a pitch reset, the sensing of paper path switches, interlock sensors, and any other switch or sensor.

(2) A timed suspension on either the Real Time Clock or the Machine Clock.

(3) A condition waiting for the first of several events to become true.

The Timer Manager establishes various status information in RAM locations. In particular, the Timer Manager uses a two-celled singly linked list to maintain information on all suspended tasks. One of the cells contains the task suspend duration while the other cell contains the link to the task with a greater or equal suspend time duration. The last task on the list points to a list header. A list header pointing to itself implies an empty list.

The Timer Manager uses various commands to perform these functions. In particular, $ERR-HANDLER Handles various errors and displays them, e.g. unknown commands, task not suspended, etc.

LOAD MACRO

Generates code to read timer hardware and store values in appropriate registers.

STORE MACRO

Generates code to read appropriate registers and store the values read into the hardware registers.

START MACRO

Depending on the base specified, this macro then selects either $UR-TD-START-MC or $UR-TD-START-RTC to start a task's suspend request.

$UR-TD-START-type

Works on all type-dependent(where type is either MC for Machine Clock or RTC for Real Time Clock) variables then calls $UR-TD-START to start the task's suspend request.

$UR-TD-START

Is used by the two procedures above. It links the task into the appropriate table and sets a flag indicating whether the new task ended up at the head of the table.

In accordance with another aspect of the present invention, the Communication Manager 148 performs various functions to receive data from the shared line 80 and to transmit data on the shared line. For example, the Communication Manager 148 checks the type of contents in a "Present" receiver buffer. If the contents of the buffer is a message, the Communication Manager sets a condition false. If the contents of the buffer is an acknowledgement, the Timer Manager 146 sets a condition true, if the acknowledgement is the expected one. It does this by comparing a message history descriptor contained in the acknowledgement to one in a temporary byte register.

The Communication Manager also examines the "next" receiver buffer. If it is not empty, a condition false is set to establish the "present" receiver buffer to be the "next" receiver buffer descriptor. The Communication Manager also updates the "next" receiver buffer and initializes the received message by byte count. It also stores the ID of the message in a first temporary register 1 and stores the staus of the message into a second temporary register 2.

The Communication Manager also handles retransmitted messages in the following manner. It checks a message history descriptor byte in the "present" receiver buffer and the saved sequence number from the last message from the same source processor and sets condition true if it is a duplicate message.

Figure 10A:
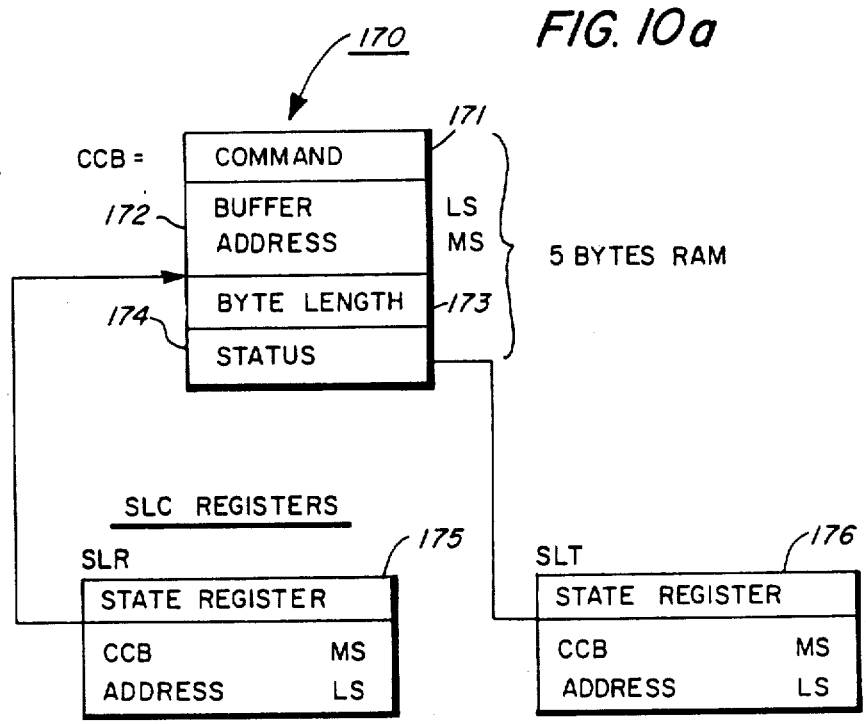
FIGS. 10a and 10b are illustrations of the exchange of information between one controller board and another controller board, in particular, showing the communication command buffers, the state registers and the communication packet format.
Figure 10B:
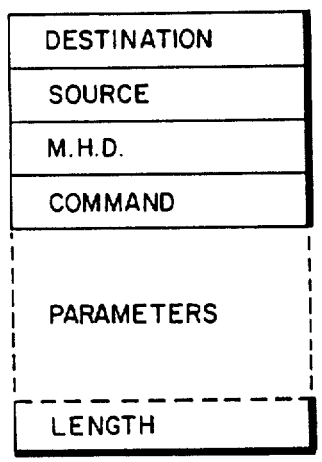

In addition, the Communication Manager 148 handles the Command Control Block (CCB) and the Shared Line Receiver State Register and the Shared Line Transmitter State Register. With reference to FIGS. 10a and 10b, the Command Control Block 170 comprises a command byte 171, two buffer address bytes 172, a byte-length byte 173 and a status byte 174. These are locations in RAM associated with the particular processor on a control board. Upon receipt of a command in the Shared Line Receiver State Register 175, the state register will refer to the address of a Command Control Block 170 for further identification of the type of data being received and the locations in RAM where the data is to be stored.

In a similar manner, the Shared Line Transmitter State Register 176 contains the address of a Command Control Block 170. The Command Control Block provides the necessary instructions and address in RAM memory of information to be transmitted onto the shared line 80.

In accordance with another aspect of the present invention, an interrupt is performed only after an atomic operation is completed. An atomic operation is defined as an operation that does not allow for implicit preemption. In a preferred embodiment, the atomic operation is an Operating System Instruction. Therefore, since the Instruction execution is completed, the amount of status that must be saved is minimized, making task switching more efficient. Also, since the Instruction is completed, any variable that two tasks share is always left in a stable state allowing either of the tasks to operate on the variable.

Specifically, after each Operating System Instruction there are two commands. One command immediately allows any interrupts to be serviced. The next command then immediately closes out any interrupts allowing for the execution of the next operating system instruction. In other words, the control selectively turns on or off the acceptance of interrupt signals.

This can be done using the microprocessor hardware itself or, for some interrupts in a preferred embodiment, a programmable interrupt controller is used. Using the microprocessor, in particular the Intel 8085, there can be an enable interrupt signal to open up the 8085 to interrupts, immediately followed by a disable interrupt signal.

Primitive Instructions are used for servicing interrupts. For example,

PMTS $INSERT

Error: Task, identified by $FOUND_ID, is already scheduled.

Error: $PRIORITY_VALUE is not a defined priority level.

Error: No more scheduled tasks possible.

Failure: Found task is not active.

Failure: Current task is not valid.

Explanation: The identified task is queued (i.e. alloted further scheduling considerations). The task's initial allotments for waiting time and execution slice size are determined by $PRIORITY_VALUE.

$PMTS PRIORITY

Error: $PRIORITY_VALUE is not a defined priority level.

Error: Task identified by $CURRENT_ID is not scheduled.

Failure: Current task is not valid.

Failure: Next task is not valid.

Explanation: The current task's scheduling allotments (i.e. waiting time and execution size) are modified to reflect the requested level of $PRIORITY_VALUE. A preemptive break opportunity is given and the next task begins execution. If the current task was spooled it is rescheduled.

PMTS $THREAD

Error: Current task is not scheduled or spooled.

Error: No more suspensions possible.

Failure: Current task is not valid.

Explanation: The current task is stopped from further execution (i.e. removed from the queue) and placed in suspension. Its scheduling allotments, i.e. waiting time and execution slice size, are increased to the maximum. A preemptive break opportunity is given and the next task begins execution.

Figure 11:
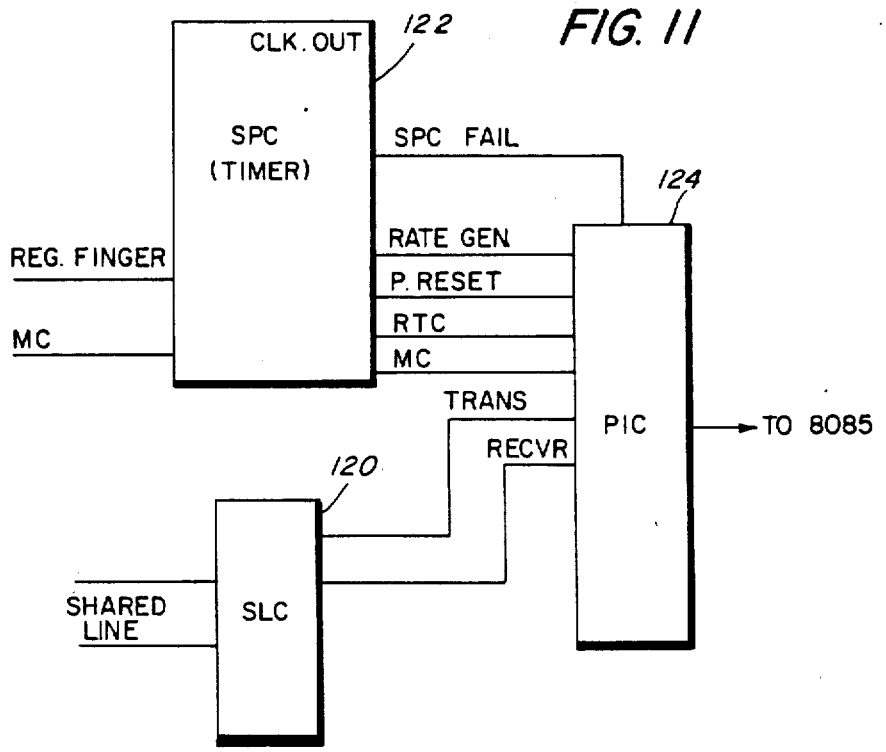
FIG. 11 is a block diagram of the interrupt scheme according to one aspect of the present invention.

With reference to FIG. 11, there is shown the Programmable Interrupt Controller (PIC) 124 in turn connected to an 8085 microprocessor. Providing input interrupt signals to the PIC 124 are the SPC or timer 122 and the SLC or Shared Line Controller 120. It should be noted that this basic configuration is on all of the control boards as shown in FIG. 2. The registration finger signal and the machine clock pulses are conveyed to the timer 122. For purposes of this description, however, it is only necessary to note that interrupt signals are conveyed from the timer 122 to the PIC 124, in particular, an SPC fail signal, a rate generator signal, a pitch rest signal, a machine clock pulse and a real time clock pulse. Two other interrupts are provided to the PIC 124, a transmission signal and a receive signal interrupt from the SLC 120.

The Programmable Interrupt Controller (PIC) 124 is basically an LSI macro for use in real time, interrupt driven systems. It manages up to eight vectored priority interrupt requests with built-in features permitting the selective masking of any interrupt level. Specifically, in order of priority, the main interrupts are the (1) Machine Clock, (2) Pitch reset, (3) Real Time Clock (RTC), (4) Transmitter, (5) Rate Generator, (6) Receiver, and (7) SPC failure.

The programmable interrupt Controller 124 accepts interrupt requests, determines which of the incoming requests is of the highest priority, ascertains whether the new request is a higher priority than the one currently being serviced and issues an interrupt to a microprocessor based on this determination.

The Programmable Interrupt Controller 124, after issuing an interrupt to the processor, will vector a program counter to a service routine associated with the requesting interrupt. The Programmable Interrupt Controller does this by providing the processor with a three-byte CALL instruction. Essentially the Programmable Interrupt Controller allows a microprocessor to execute its main program and only stops to service an event when instructed to do so by the Programmable Interrupt Controller input.

In operation, an interrupt sequence is as follows with reference to the FIG. 12:

(1) When any one of the NIR lines is driven low, the edge detect logic 200 will capture the interrupt requests into unique positions representing the specific interrupt level and strobe it into the Interrupt Pending Register (IPR) 206, resulting in the merging of the new interrupt request into the Interrupt Pending Register 206.

(2) The Mask Logic 211 will take the contents of the Interrupt Pending Register 206 and the Interrupt Mask Register (IMR) 210 and determine which pending interrupts can advance to the active state.

(3) Priority Logic (1) 212 will take the highest pending interrupt and determine if it is of a higher priority than the active interrupt currently being serviced. If it is lower than the current active interrupt, the pending interrupt is blocked from advancing to the Interrupt Active Register (IAR) 208. However, if it is higher than the active interrupt currently being serviced, it will send INT to the microprocessor.

(4) The microprocessor will acknowledge the INT by responding with a NINTA. On receiving the NINTA, the highest priority pending interrupt is advanced to the active state and the corresponding bit in Interrupt Active Register 208 is set while the bit in the Interrupt Pending Register 206 is reset. The Programmable Interrupt Controller will release a CALL instruction code onto the eight-bit Data Bus.

(5) This CALL instruction will cause the microprocessor to initiate two more NINTA pulses to be sent back to the Programmable Interrupt Controller.

(6) The first NINTA pulse will cause the Vector Generator 216 to select the appropriate five bits of the interrupt service routine starting address, and concatenate it to the contents of the Interrupt Vector Low (IVL) 220. This eight bits of the least significant half of the routine address, will then be released onto the eight-bit Data Bus.

(7) On receiving the second NINTA pulse, the contents of the Interrupt Vector High (IVH) 218, the eight bits of the most significant half of the routine address will be put onto the Data Bus, thereby completing the three-byte CALL instruction by the Programmable Interrupt Controller.

(8) The Interrupt Active Register 208 bit remains set until an appropriate End-of Interrupt (EOI) command is issued at the end of the interrupt sequence.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. In a control system for an electrostatographic machine having a plurality of operating components, the operating components cooperating with one another to produce impressions on support material, said control having at least one microprocessor and a plurality of priority interrupts for interrupting the microprocessor to change control of said operating components, the control including an operating system responding to operating system instructions and commands, the operating system instructions corresponding to assembly language instruction in the microprocessor, the method of controlling operating of the machine including the steps of executing an operating system instruction,
upon completion of each operating instruction, acknowledging a first command to service an interrupt, and
upon a given time period, acknowledging another command to close out the acceptance of interrupt signals allowing for the execution of the next operating system instruction to continue control of the operating components whereby after the completion of each operating instruction, there is a brief time period interrupt window in which internal requests or interrupts from the internal control of the electrostatographic machine can be serviced.

2. The method of claim 1 wherein the first command allows an interrupt to be immediately serviced.

3. The method of claim 2 wherein said another command closes out any interrupts.

* * * * *